United States Patent
Wolfe

(10) Patent No.: US 7,621,380 B2
(45) Date of Patent: Nov. 24, 2009

(54) MOTORCYCLE REAR-WHEEL BRAKING SYSTEM OPERATING MECHANISM

(76) Inventor: Joseph A. Wolfe, P.O. Box 26, Rockmart, GA (US) 30153

( * ) Notice: Subject to any disclaimer, the term of this patent is extended or adjusted under 35 U.S.C. 154(b) by 392 days.

(21) Appl. No.: 11/306,089

(22) Filed: Dec. 15, 2005

(65) Prior Publication Data
US 2008/0135347 A1    Jun. 12, 2008

(51) Int. Cl.
F16D 65/14    (2006.01)
(52) U.S. Cl. .................. 188/2 D; 303/137; 74/481
(58) Field of Classification Search .............. 188/2 D, 188/24.22; 303/157; 74/481, 488, 489, 491, 74/531, 538, 539, 501.6, 502.2, 504, 506, 74/511 R
See application file for complete search history.

(56) References Cited

U.S. PATENT DOCUMENTS

| | | | |
|---|---|---|---|
| 1,910,527 A * | 5/1933 | Dormoy | 188/18 R |
| 2,322,499 A * | 6/1943 | Andrews | 188/106 R |
| 3,960,030 A * | 6/1976 | Williams | 74/481 |
| 4,008,903 A | 2/1977 | Ramond | |
| 4,149,432 A * | 4/1979 | Costahaude | 74/489 |
| 4,501,340 A | 2/1985 | Yoshida | |
| 4,635,442 A | 1/1987 | Bass | |
| 5,050,381 A | 9/1991 | Matsuno et al. | |
| 5,636,518 A | 6/1997 | Burgoyne et al. | |
| 6,141,964 A | 11/2000 | Green | |
| 6,209,687 B1 | 4/2001 | Hundley | |
| 6,250,447 B1 | 6/2001 | Brandl et al. | |
| 6,318,490 B1 | 11/2001 | Laning | |
| 6,409,285 B1 | 6/2002 | Wakabayashi et al. | |
| 6,715,848 B2 | 4/2004 | Chen et al. | |
| 6,820,710 B2 | 11/2004 | Fechner | |
| 2006/0076197 A1 * | 4/2006 | Ishida | 188/72.8 |

FOREIGN PATENT DOCUMENTS

DE    3441916 A1 *    5/1986
JP    2003112684 A *    4/2003

* cited by examiner

Primary Examiner—Xuan Lan Nguyen
(74) Attorney, Agent, or Firm—Michael L. Greenberg, Esq.; Greenberg & Lieberman, LLC

(57) ABSTRACT

A mechanism for placing a hand operated rear-wheel brake lever of a motorcycle on the left handlebar of the motorcycle. A steel wire is routed from the right foot brake pedal by an extension to a small lever found under the clutch hand lever on the left handlebar. When the lever is pulled inward, the wire pulls the right foot brake pedal up, activating the hydraulically operated braking system of the motorcycle's rear wheel without the rider having to use his/her right foot. Riders who engage in racing or who are traveling at high speeds have greater precision in their ability to brake the rear wheel of their vehicle.

10 Claims, 3 Drawing Sheets

MOTORCYCLE REAR-WHEEL BRAKING SYSTEM OPERATING MECHANISM

FIELD OF THE INVENTION

The present invention relates to a rear-wheel braking system mechanism for motorcycles that is activated by a wire cable and operated with a mounted lever on the left handlebar.

BACKGROUND OF THE INVENTION

In a typical motorcycle, and unlike a bicycle, the clutch is found on the left handlebar. The twist-grip throttle control and the front-wheel brake lever are two different controls on the right handlebar. The right foot pedal is where the brake for the rear wheel is normally found.

Motorcyclists who engage in racing find it difficult at very high speeds (even at highway speeds) to press down upon the right foot pedal to brake. This is due in part to the movement being somewhat awkward for the user. At high speeds, even a small bump or a turn in the road can affect the foot from accurately pressing down upon the right foot pedal to brake; either the obstruction in the road or the angle of the foot impedes the motorcyclist from being confident in the ability to brake using the right foot pedal, thereby slowing down the rear wheel. It is simply not as precise as the movement of the hand upon one of the levers of the handlebars. Preferably, the process of braking would be done with both the front and back wheels of the motorcycle; using the front brake only is a matter of the rider consciously not using the right foot pedal due to its inherent drawbacks.

It has been shown that motorcycle racers and other motorcyclists who drive at high speeds will resort to solely using the front-wheel brake found on the right handlebar. Obviously, using the front-wheel brake on the right handlebar, while it is an easier and more precise movement for the motorcyclist, can be dangerous, as the front wheel could skid, causing loss of control, or in an extreme scenario the motorcycle could risk flipping over in a forward direction; the front wheel is braking while the back wheel is still going full-speed.

Hence, there is a need for the placement of a hand lever for the rear-wheel brake on one of the handlebars. This seems like an obvious solution, but the right handlebar already comprises the twist-grip throttle control and front-wheel brake lever, so placing another brake lever there is not a viable solution. The left handlebar, on the other hand, comprises the clutch. Mistaking the rear-wheel brake lever for the clutch is also a dangerous possibility, especially in heavy, stop-and-go traffic. Therefore, the placement of the lever that activates the rear-wheel brake should be in a place that would not be able to be mistaken for the clutch, which would obviate the need for the user to use his/her foot when braking the rear wheel.

Relevant art includes European Patent Publication 1160152A1, published for Brembo on Dec. 5, 2001, which discloses a mechanism to adjust the position of the operating lever on a motorcycle handlebar. Unlike the present invention, it does not displace the location of the rear-wheel brake lever. Japanese Patent Publication 58033560A published for Tsutomu on Feb. 26, 1983 describes brake gear for a motorcycle. This pertains more generally to the mechanism braking system and not the placement of the brake levers themselves. U.S. Pat. No. 4,008,903 issued to Ramond on Feb. 22, 1977, is a mechanism for a steering wheel. This comprises an entirely different issue, which relates more to the steering of the motorcycle than the operation of the brakes.

Additionally, there is a plethora of relevant art such as hydraulic cylinders as disclosed in U.S. Pat. No. 4,501,340 (issued to Yoshida, Feb. 26, 1985); U.S. Pat. No. 4,635,442 (Bass, Jan. 13, 1987); U.S. Pat. No. 5,050,381 (Matsuno et al., Sep. 24, 1991); U.S. Pat. No. 5,636,518 (Burgoyne et al., Jun. 10, 1997); and finally U.S. Pat. No. 6,250,447 (Brandl et al., Jun. 26, 2001). These patents pertain more particularly to hydraulic operating systems and mechanisms relating to the master cylinders of the brakes and, unlike the present invention, do not provide a solution to placing the rear-wheel brake on the handlebars.

Other relevant art includes cruise control systems for motorcycles as disclosed in U.S. Pat. No. 6,318,490 (issued to Laning on Nov. 20, 2001) and U.S. Pat. No. 6,820,710 (issued to Fechner on Nov. 23, 2004). These patents relate more specifically to the cruise control systems and not the braking mechanism of the motorcycles.

Relevant art also includes U.S. Pat. No. 6,141,964, issued to Green on Nov. 7, 2000, which describes a master cylinder relocation kit pertaining to the front brake. This invention aims to separate the master cylinder assembly from the front brake lever and relocate it out of sight for aesthetic reasons and thus comprises an entirely different issue. U.S. Pat. 6,209,687 B1, issued to Hundley on Apr. 3, 2001, describes a dual-brake handle. The user can use the brake handle as a single (rear-wheel only) or a double brake, which can be considered inconvenient since both of the brakes are on the same lever. Unlike the present invention, the dual brakes are on the same handlebar, which can be confusing for the motorcyclist. U.S. Pat. No. 6,409,285 B1 issued to Wakabayashi et al. on Jun. 25, 2002, is a front and rear-wheel braking system for motorcycles. The invention allows front and rear-wheel interlocking brake operation, but unlike the present invention does not replace the location of the rear-wheel brake. U.S. Pat. 6,715,848, issued to Chen et al. on Apr. 6, 2004 is an anti-lock braking system for motorcycles. It is different from the present invention in that it aims to improve the braking mechanism but does not aim to change the placement of the rear-wheel brake to a more convenient location on the motorcycle.

SUMMARY OF THE INVENTION

The present invention aims to eliminate the problem of having a rear-wheel brake, solely activated by the right foot pedal, by wiring the brake foot pedal (from an extension placed at the rear of the pedal that functions as a lever) to a small hand lever mounted on the left handlebar, thereby allowing a secondary means of activation of the rear-wheel hydraulic braking system. The lever operates the rear wheel brake and effectively obviates the need to use the right foot pedal for rear-wheel braking. This is especially convenient for those who engage in rough motor-cross or motorcycle racing. The braking mechanism is more efficient and precise when it is operated with the lever on the left handlebar.

The rear-wheel lever is of the standard design typical to motorcycles but is substantially smaller in scale allowing room for just two fingers (the forefinger and middle finger) for the lever operation. The lever is mounted with a typical clamping mechanism used for mounting levers onto motorcycle handlebars.

The rear-wheel brake lever is significantly smaller in size than the clutch lever, and it is designed where it can be rotated around the handlebar. It can be placed or shifted higher or lower on the handlebar, depending on the desires of the user and what is most comfortable for them. In this fashion, the left handlebar has a hand brake lever for the rear wheel hydraulic braking system for traveling at high speed and engaging in racing; it is also in a position where it is distinguishable from the larger clutch lever, which is significantly safer for driving in traffic or in urban areas.

Integral to the invention's design is the right foot pedal. It is similar in design to pre-existing motorcycle foot brake pedals with the same function of braking the motorcycle's rear wheel by depressing the pedal with the rider's right foot. The design feature of the extension on the rear of the pedal, with a wire cable connected and routed alongside the motorcycle frame to the front of the motorcycle to a hand brake lever mounted on the left handlebar, allows the pedal to change from a single method of activation. This is advantageous to the rider depending on how he/she chooses to utilize the braking system. Essentially, the brake pedal design allows a dual means of activation with either the right foot or left hand that is unique to motorcycles.

DETAILED DESCRIPTION OF THE PREFERRED EMBODIMENT

Figure 1:
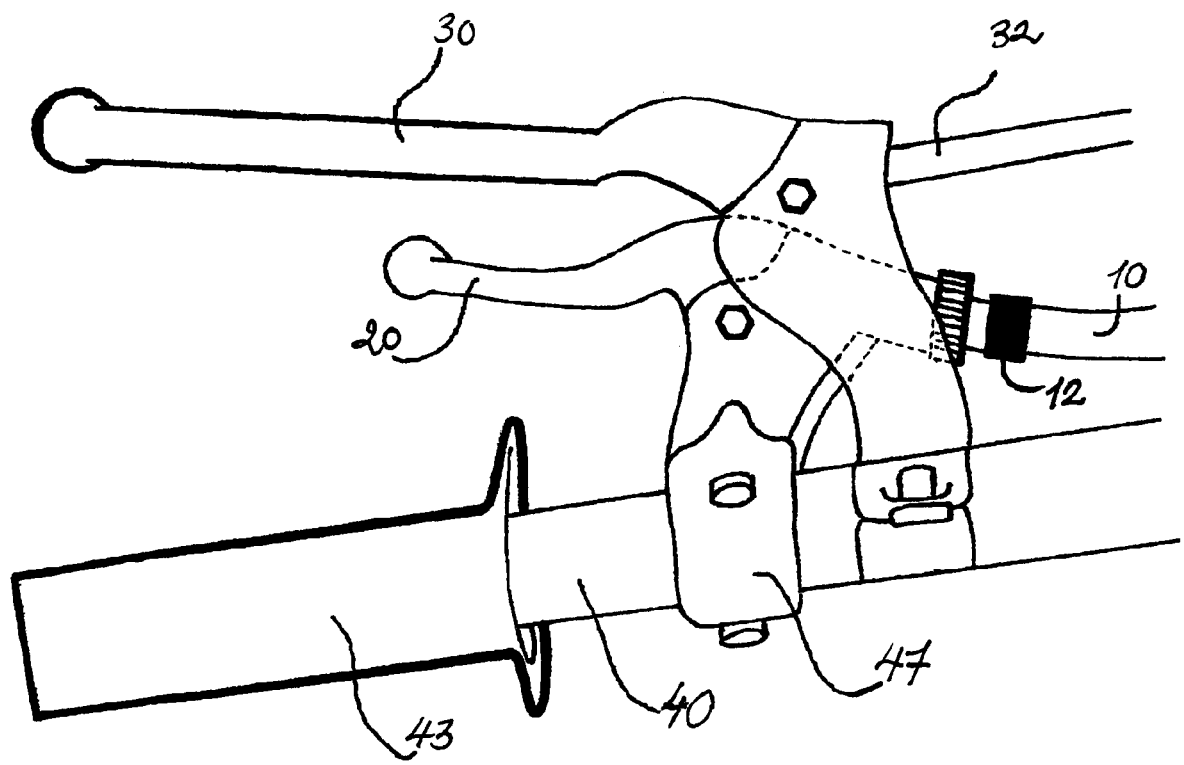
FIG. 1 is the environmental perspective of the present invention as seen on the left handlebar of the motorcycle.

The present invention is an interconnected operating mechanism for a motorcycle hydraulic rear-wheel braking system. As shown in FIG. 1 of the present invention, on the motorcycle left handlebar 40 there is a wire cable 10. The wire cable 10 that is used preferably consists of an inner steel wire cable with a flexible outer casing, similar to what is used on most motorcycle control systems. The wire cable 10 is functionally connected to the rear-wheel hand brake lever 20, mounted on the handlebar 40 by a clamping mechanism 47 typical to motorcycle control levers. The rear-wheel brake lever 20 is mounted and rotated downward under the larger clutch lever 30 mounted inboard on the handlebar 40. The positioning of the rear-wheel brake lever 20 and the clutch lever 30 is defined with respect to their linear position along the longitudinal axis of the handlebar 40. There is ample room between the two levers 20 and 30 on the left handlebar 40 to ensure safe and efficient operation. Mounted to the rear-brake lever assembly 20 is a threaded adjusting barrel 12 that upon rotation allows the wire cable 10 slack to be adjusted to suit rider preference. The clutch wire cable 32 is routed from the clutch lever 30 to the engine of the motorcycle. The left handlebar 40 has a typical rubber handgrip 43 mounted outboard on the end upon which the rider places their left hand while riding.

Figure 2:
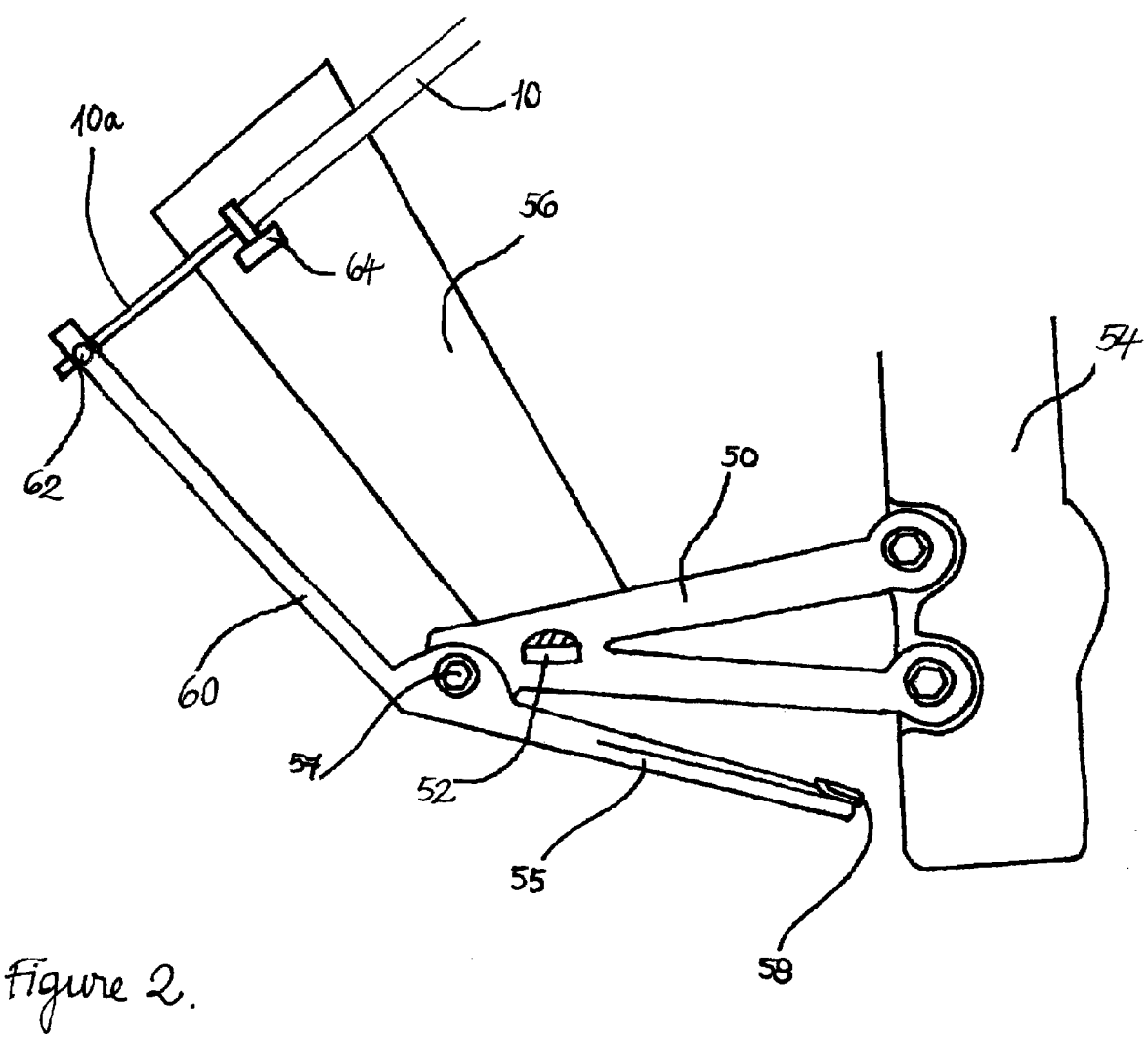
FIG. 2 is the environmental perspective of the present invention as seen on the right foot brake pedal.
Figure 3:
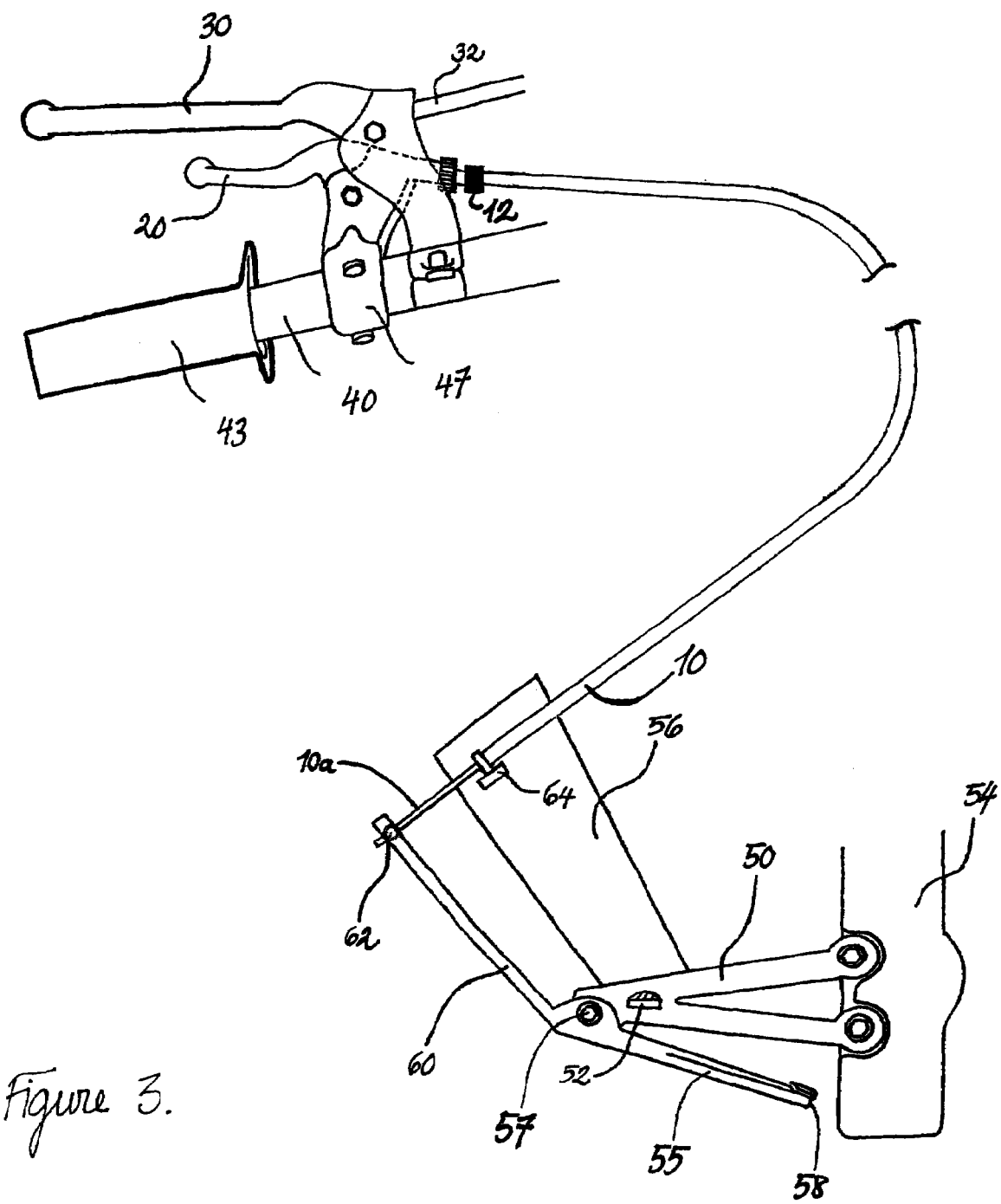
FIG. 3 is a view of the hand lever and brake pedal with the interconnecting wire.

In FIG. 2 and FIG. 3, there is a right foot operated brake pedal 55, similar to typical pre-existing designs but with the design feature of an extension 60, that is attached to the rear of the brake pedal 55. This in turn extends toward the rear of the motorcycle at or near a forty-five degree angle in relation to the longitudinal axis of the brake pedal pivot 57 and the brake pedal tip 58.

The brake pedal 55 is pivotally mounted to the brake pedal-footrest bracket 50, which in turn is bolted to the motorcycle frame member 54. Attached to the brake pedal-footrest bracket 50 is the footrest 52, typical to other designs, whereupon the rider places his/her right foot while riding. Attached to the brake pedal-footrest bracket 50 is the boot-guard 56 similar to other designs found on motorcycles. The boot-guard 56 serves the function of allowing the rider's right foot to have a flat surface to rest against while riding. Attached to the upper end of the boot guard 56 is the cable end mount 64 in which the outer steel casing 10 is secured to allow the steel inner wire 10a to function by sliding back and forth. The steel inner wire cable 10a is functionally connected to the end of brake pedal extension 60 to a nut-bolt assembly 62, housed in a hole drilled into the brake pedal extension's 60 end. The nut-bolt assembly 62 consists of a small bolt with a small hole drilled through the threaded portion in which the steel inner wire cable 10a is secured/pinched, allowing the steel inner wire cable 10a to be functionally attached to the brake pedal extension 60. The wire cable 10/10a is routed alongside the motorcycle frame as implied in FIG. 3, and functionally connects the right foot brake pedal 55 to the left handlebar hand brake lever 20. As shown, the right foot brake pedal 55 is in proximity to the brake pedal-footrest bracket 50 and extension 60. The brake hand lever 20 is mounted on the left handlebar 40.

The movement of the inner wire cable 10a by the left hand on the rear brake lever 20 activates the rear wheel brake. When the brake hand lever 20 is pulled inward, the steel wire cable 10a pulls on the brake pedal extension 60 thereby activating the hydraulic braking system of the rear wheel. There is ample room between the two levers 20 and 30 on the left handlebar 40 to ensure that braking will be a smooth and safe operation. The brake lever 20 is also able to be rotated so that the rider can easily distinguish the two levers 20 and 30.

Another advantage of the hand lever activation of the rear wheel hydraulic braking system is convenient for slowing down the motorcycle from a high rate of speed. Through the brake lever 20 on the handlebar 40 the rider can sense or feel the amount of force necessary to slow down the motorcycle, augmenting the degree of precision of braking, as opposed to the foot pedal brake 55, which is more advantageous for stopping the motorcycle completely. Placing the brake lever 20 on the left handlebar 40 as a secondary means of activation of the rear wheel hydraulic braking system is therefore convenient for both the motorcycle racer and the average rider. The brake lever 20 on the left handlebar 40 allows the rider to brake in a controlled and sustainable fashion whether they are driving at high or average speeds, because they are able to brake both wheels simultaneously. This is less dangerous than simply using the front wheel to brake, or consciously avoiding the right foot brake 55 because it is not a smooth movement for the rider.

Having illustrated the present invention, it should be understood that various adjustments and versions might be implemented without venturing away from the essence of the present invention. The present invention is not limited to the embodiments described above, and should be interpreted as any and all embodiments within the scope of the following claims.

What is claimed is:

1. A rear-wheel braking system operating mechanism for a motorcycle, the motorcycle having a clutch hand lever on a handlebar, comprising: a brake hand lever; a wire in communication with said brake hand lever; a brake pedal extension being wired to said brake hand lever via said wire; said brake pedal extension in communication with a right foot brake pedal and a hydraulically operated rear-wheel brake; a brake pedal pivot disposed between said brake pedal extension and said right foot brake pedal, said brake pedal extension and said right foot brake pedal fixed relative to one another; and said brake hand lever pulls said right foot brake pedal via said brake pedal extension to actuate said hydraulically operated rear-wheel brake.

2. The rear-wheel braking system operating mechanism of claim 1, wherein said brake hand lever is smaller in size in relation to said clutch hand lever of the left handlebar.

3. The rear-wheel braking system operating mechanism of claim 1 wherein said brake hand lever is shorter than said clutch hand lever.

4. The rear-wheel braking system operating mechanism of claim 1 wherein said brake hand lever is configured to receive two fingers of the user.

5. The rear-wheel braking system operating mechanism of claim 1 wherein said brake hand lever is configured to be rotated about the longitudinal axis of the left handlebar of the motorcycle.

6. The rear-wheel braking system operating mechanism of claim 1 wherein said brake hand pedal extension controls the motorcycle's rear braking ability.

7. The rear-wheel braking system operating mechanism of claim 1 wherein said brake pedal extension pulls on said right foot brake pedal.

8. The rear-wheel braking system operating mechanism of claim 1 wherein said brake pedal extension is configured to be in communication with said hydraulically operated rear-wheel brake of the motorcycle so as to active it.

9. The rear-wheel braking system operating mechanism of claim 1 wherein said brake pedal extension is configured to allow a secondary, alternative means of activation of said rear-wheel hydraulic braking system by said hand brake lever mounted on said handlebar of said motorcycle.

10. The braking system operating mechanism of claim 1, wherein said brake pedal extension is disposed at a 45 degree angle from said right foot brake pedal.

* * * * *